United States Patent
Fischer et al.

(10) Patent No.: US 12,343,936 B2
(45) Date of Patent: Jul. 1, 2025

(54) PRINT HEAD FOR AN ADDITIVE MANUFACTURING SYSTEM, AND ADDITIVE MANUFACTURING SYSTEM

(71) Applicant: KUMOVIS GMBH, Taufkirchen (DE)

(72) Inventors: Stefan Fischer, Iffeldorf (DE); Miriam Haerst, Munich (DE); Stefan Leonhardt, Munich (DE); Sebastian Pammer, Munich (DE)

(73) Assignee: KUMOVIS GMBH, Taufkirchen (DE)

( * ) Notice: Subject to any disclaimer, the term of this patent is extended or adjusted under 35 U.S.C. 154(b) by 262 days.

(21) Appl. No.: 17/597,877

(22) PCT Filed: Jul. 28, 2020

(86) PCT No.: PCT/EP2020/071323
§ 371 (c)(1),
(2) Date: Jan. 27, 2022

(87) PCT Pub. No.: WO2021/032420
PCT Pub. Date: Feb. 25, 2021

(65) Prior Publication Data
US 2022/0203613 A1 Jun. 30, 2022

(30) Foreign Application Priority Data

Aug. 20, 2019 (DE) .................. 10 2019 122 302.4

(51) Int. Cl.
*B29C 64/209* (2017.01)
*B29C 64/295* (2017.01)
*B33Y 30/00* (2015.01)

(52) U.S. Cl.
CPC .......... *B29C 64/209* (2017.08); *B29C 64/295* (2017.08); *B33Y 30/00* (2014.12)

(58) Field of Classification Search
CPC .......................... B29C 64/209; B29C 64/295
See application file for complete search history.

(56) References Cited

U.S. PATENT DOCUMENTS 6,033,301 A 3/2000 Suwa
6,722,872 B1 4/2004 Swanson et al.
(Continued)

FOREIGN PATENT DOCUMENTS

CN 109466058 A 3/2019
DE 102015111504 A1 1/2017
(Continued)

OTHER PUBLICATIONS

ISA European Patent Office, International Search Report Issued in Application No. PCT/EP2020/071323, Nov. 4, 2020, WIPO, 3 pages.
(Continued)

*Primary Examiner* — Alison L Hindenlang
*Assistant Examiner* — Alexander A Wang
(74) *Attorney, Agent, or Firm* — McCoy Russell LLP

(57) ABSTRACT

The present disclosure relates to a print head for an additive manufacturing system, in particular for a 3D printer, comprising at least one temperature control element, in particular a cooling element, which is arranged adjacent to the print head.

The present disclosure further relates to an additive manufacturing system, in particular a 3D printer, comprising at least one print head.

11 Claims, 2 Drawing Sheets

(56) References Cited

U.S. PATENT DOCUMENTS

| | | |
|---|---|---|
| 6,817,941 B1 | 11/2004 | Gatov |
| 2015/0110911 A1 | 4/2015 | Snyder |
| 2016/0088048 A1 | 3/2016 | Park et al. |
| 2016/0207263 A1 | 7/2016 | Gordon |
| 2017/0157855 A1* | 6/2017 | Larson ................ B29C 64/336 |
| 2018/0043612 A1 | 2/2018 | Gray et al. |
| 2020/0361224 A1* | 11/2020 | Navas ................... B41J 11/002 |

FOREIGN PATENT DOCUMENTS

| | | |
|---|---|---|
| EP | 2261009 A1 | 12/2010 |
| EP | 3023228 A1 | 5/2016 |
| EP | 3106290 A1 | 12/2016 |
| EP | 3173233 A1 | 5/2017 |
| EP | 3578365 A1 | 12/2019 |
| WO | 2016063198 A1 | 4/2016 |
| WO | 2016088048 A1 | 6/2016 |
| WO | 2017040675 A1 | 3/2017 |
| WO | 2017108477 A1 | 6/2017 |
| WO | 2018114384 A1 | 6/2018 |
| WO | 2020178335 A1 | 9/2020 |

OTHER PUBLICATIONS

European Patent Office, European Office Action Issued in Application No. 20753300.1, Jul. 21, 2023, 6 pages.

* cited by examiner

PRINT HEAD FOR AN ADDITIVE MANUFACTURING SYSTEM, AND ADDITIVE MANUFACTURING SYSTEM

CROSS REFERENCE TO RELATED APPLICATIONS

The present application is a U.S. National Phase of International Application No. PCT/EP2020/071323 entitled "PRINT HEAD FOR AN ADDITIVE MANUFACTURING SYSTEM, AND ADDITIVE MANUFACTURING SYSTEM," and filed on Jul. 28, 2020. International Application No. PCT/EP2020/071323 claims priority to German Patent Application No. 10 2019 122 302.4 filed on Aug. 20, 2019. The entire contents of each of the above-listed applications are hereby incorporated by reference for all purposes.

TECHNICAL FIELD

The present disclosure relates to a print head for an additive manufacturing system, in particular for a 3D printer, as well as to a corresponding additive manufacturing system.

BACKGROUND AND SUMMARY

In connection with the 3D printing of plastics in particular for medical applications (e.g. for implants), it is mainly the currently achievable component quality which is in the focus of many scientific studies. Two of the most important challenges, which play a decisive role with regard to component quality, are component distortion and shrinkage with the corresponding effect on component tolerance and component mechanics.

By way of example, a 3D printing device, in particular an FFF printing device, comprising at least one print head unit is already known from DE 10 2015 111 504 A1, said print head unit being provided in at least one operating state for melting a print material formed at least partially by a high-performance plastic material, in particular a high-performance thermoplastic polymer.

Further, EP 2 261 009 A1 discloses a device and a method for producing a three-dimensional object, said device comprising a vacuum pump coupled to a feed reservoir for generating an air flow through said feed reservoir.

Moreover, EP 3 023 228 A1 shows an additive manufacturing device having a gas flow system in order to provide a gas flow over the area of the build-up platform of the additive manufacturing device.

Furthermore, EP 3 173 233 A1 discloses a three-dimensional manufacturing device with a processing chamber heated by a processing chamber heating unit provided for this purpose.

In addition, U.S. Pat. No. 6,033,301 A discloses a combined fan-filter unit which is provided for filtering the air of an air circuit in a clean room.

U.S. Pat. No. 6,722,872 B1 further shows a three-dimensional modelling device which is intended for building up three-dimensional objects within a heated build-up compartment.

In addition, a diffuser for generating a uniform air flow within a process chamber is shown in U.S. Pat. No. 6,817,941 B1, said process chamber being used, for example, in the production of semiconductor chips.

Furthermore, US 2015/110911 A1 shows an environment monitoring or control unit, which is used with additive manufacturing technologies, for example, as an interface to its respective environments.

Besides, WO 2016/063198 A1 shows a method and a device for manufacturing three-dimensional objects by "Fused Deposition Modelling", wherein the manufacturing device comprises radiation heating elements which can heat a surface of the object to be manufactured exposed to them.

In addition, a clean room technology for 3D printers and so-called bio-printers is known from WO 2017/040675 A1.

Further, a method for producing a three-dimensional object with a "Fused Deposition Modelling" printer can be taken from WO 2017/108477 A1.

Based on the solutions proposed in the state of the art, there are still problems with regard to these additive manufacturing devices, in particular in terms of the insufficient adjustability of the temperature for medical applications, the component accuracy, the management of the shrinkage effect and the necessity to be able to produce smaller and finer structures such as grid structures or similar.

In addition, in particular in connection with medical applications, but also with miniature and micro applications, appropriate precautions must be taken to ensure that in 3D printing the corresponding material and the structures to be formed maintain their shape accordingly. This object is not easy to fulfil.

It is therefore the object of the present disclosure to further develop a print head of the aforementioned kind as well as an associated additive manufacturing system of the aforementioned kind in a beneficial manner, in particular in such a way that the mechanical properties of the printing material and of the end product can be better influenced, in particular to the effect that finer structures and also very small structures can be formed.

This object is achieved according to the disclosure by a print head. According to this, provision is made that a print head for an additive manufacturing system is made available, in particular for a 3D printer, the print head comprising at least one temperature control element, in particular a cooling element, which is arranged adjacent to the print head.

The disclosure is based on the fundamental idea that the printing material provided by the print head can be influenced by means of the temperature control element, in particular by the cooling element, in such a way that the printing material can be influenced directly after depositing or printing. For example, a direct influence on the deposited strands that are printed by the print head can be achieved. Also the surface quality can be influenced in a targeted way. Rapid solidification can be achieved by cooling. By tempering, i.e. by correspondingly adjusting the component temperature with a heated or warmed air flow, the cooling behavior of the component and thus the component quality and accuracy can be adjusted.

In addition, provision may be made that the cooling element is or comprises at least one fluid supply, in particular a cooling air supply. By the supply of tempered fluid, in particular cool air or tempered air, it is possible to blow specifically against individually deposited printing material, or to accordingly perform a temperature control or cooling process in a pulsed manner, only at certain times and only in certain regions. In principle, it is conceivable that the cooling air supply or air supply provides air, air at room temperature or also extremely hot air at certain points and then additionally, if necessary, to provide appropriate cooling again. In this way, the corresponding component region or the structure to be printed can be influenced accordingly.

The cooling element may be or comprise at least one nozzle. By means of the nozzle, air or another cooling medium can be discharged specifically toward the deposited printing material. This also makes it possible to provide only a certain amount of cooling medium and thus to achieve very specific temperature control or cooling.

In particular, provision may be made that the nozzle is or comprises a ring nozzle. A ring nozzle makes it possible to provide the cooling medium over a relatively large area, but still in a targeted manner. It is also conceivable that the ring nozzle has corresponding adjustment means by means of which the air mass flow and also the air flow can be adjusted and reduced accordingly. A focusing of the air flow can also be achieved with this.

Furthermore, it may be provided that the cooling element is arranged on the print head in a fixed position. This always ensures that the cooling element and the print head are arranged in a defined way. This also makes it possible to calculate the influence of the provision of the cooling beforehand and to adjust it with regard to the effect.

The cooling element may further comprise at least one fluid source, in particular a compressed air source, and/or at least one connection to a fluid source, in particular a compressed air source. The fluid source may also be an internal fluid source of the printer, which can be connected to the cooling element. By providing compressed air or another suitable fluid, a very good cooling performance can be achieved in a comparatively simple manner even by convection only.

Furthermore, provision may be made that the cooling element comprises at least one flow heater. It is also conceivable, however, that alternatively or additionally a cooling element is provided for cooling the fluid flow. In connection with the flow heater, provision may be made that there is a constant flow through the flow heater. It is conceivable here, for example, that a constant air mass flow is provided. This constant air mass flow can also be directed past the workpiece by means of appropriate deflectors if the workpiece is not to be exposed to the flow. The flow heater makes it possible to provide the temperature control even in higher temperature ranges. This is conceivable, for example, if only small temperature differences between the printing material and the air mass flow are to be achieved.

The flow heater and/or cooling element allow(s) to accordingly adjust the temperature of the cooling medium, in particular of air or compressed air.

Furthermore, provision may be made that the cooling element comprises at least one pressure reducer. Via the pressure reducer, the inlet air pressure of the cooling element can be adjusted accordingly. The air mass flow can also be adjusted via the pressure reducer.

In addition, the cooling element may comprise at least one controllable valve which is constituted such that the valve is able to adjust the air mass flow. It is conceivable, for example, that the air flow can be individually adapted to the depositing and printing strategy. A possible range in which depositing can take place amounts to between 0 l/min to 20 l/min, for example. At 0 l/min, for example, the solution may be such that the valve directs the air—which is normally directed to the workpiece—past the workpiece and into the pressure chamber or build-up chamber, or into any other reservoir or air supply/discharge system for the machine exhaust air.

Furthermore, the present disclosure relates to an additive manufacturing system, in particular a 3D printer, comprising at least one print head as described above.

BRIEF DESCRIPTION OF THE FIGURES

Further details of the disclosure shall now be explained by means of an exemplary embodiment shown in the drawings in which.

DETAILED DESCRIPTION

Figure 1:
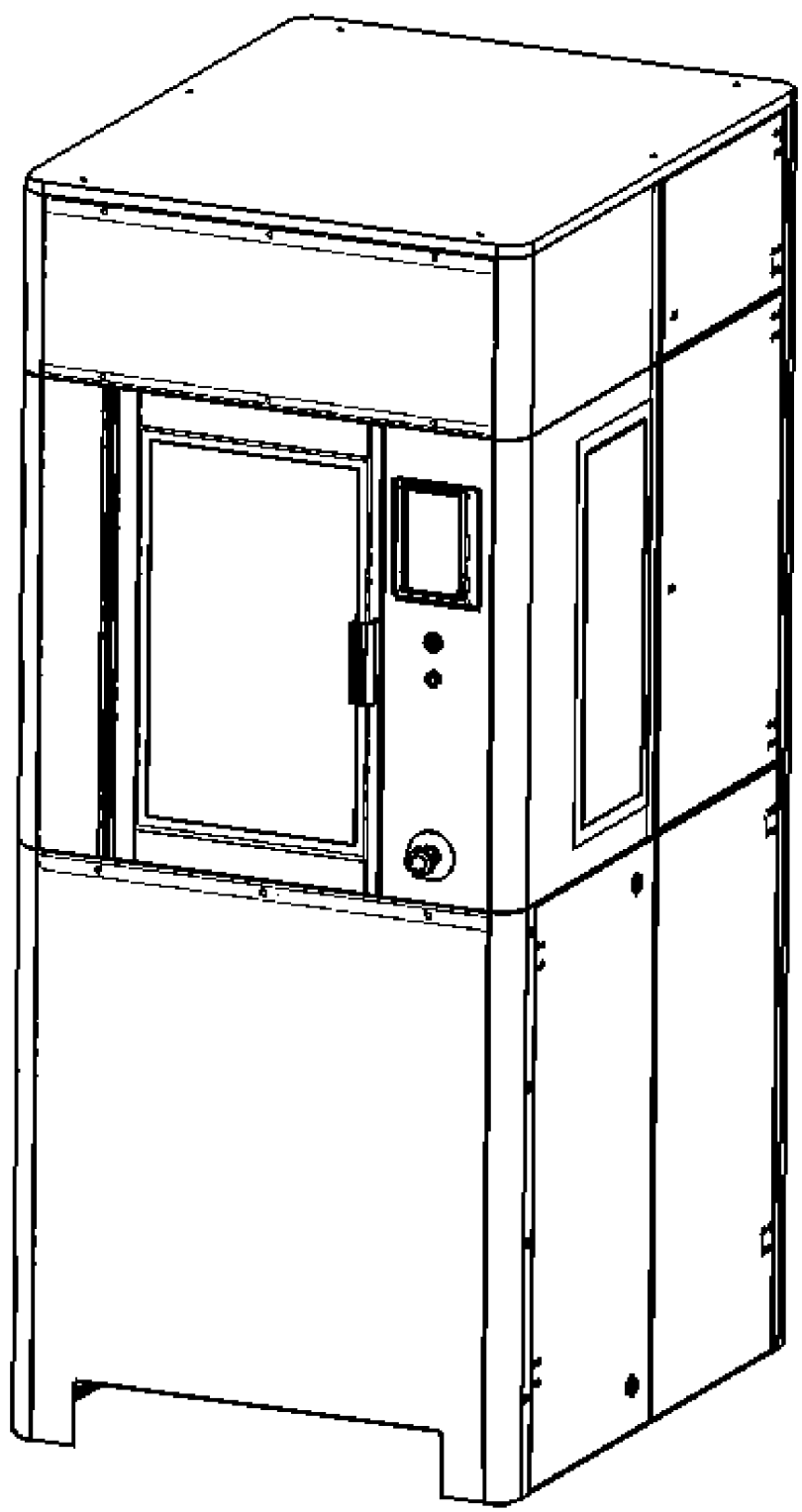
FIG. 1 shows an additive manufacturing system according to the present disclosure having a print head according to the present disclosure.
Figure 2:
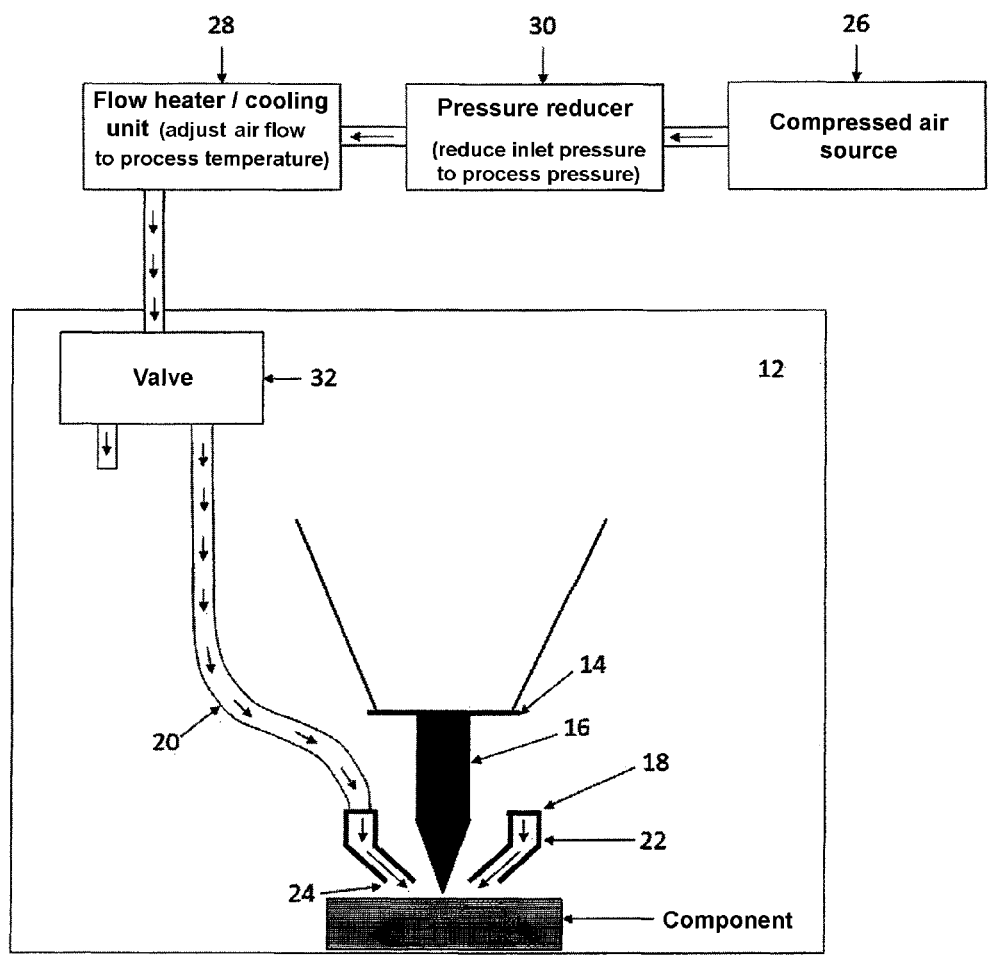
FIG. 2 shows an additive manufacturing system according to the present disclosure having a print head according to FIG. 1 in detail.

FIG. 1 and FIG. 2 show an additive manufacturing system 10 including a 3D printer.

The 3D printer 10 comprises a so-called build-up chamber 12 and a print head 14.

The print head 14 is equipped with a print material deposition device 16, by means of which the 3D printing material, in particular corresponding plastics or plastic filaments, can be deposited in order to be able to perform 3D printing in the usual way.

Furthermore, the print head 14 comprises a cooling element 18.

The cooling element 18 comprises several components, namely in particular an air supply 20.

The air supply 20 allows to supply air, in particular cooling air, to a nozzle system 22, which comprises a ring nozzle 24 here.

The nozzle system 22 is arranged on the print head 14 in a fixed position.

In addition, the cooling element 18 is connected to a compressed air source 26 via its air supply 20 in order to be able to receive compressed air.

Furthermore, the cooling element 18 is equipped with a flow heater 28. It is conceivable that the flow heater 28 also has a cooling function or comprises a cooling element.

A pressure reducer 30 is also provided.

Downstream of the flow heater 28, a controllable valve 32 is further provided.

The function can be described as follows:

Using the additive manufacturing system 10, plastics can be printed in 3D structures. Filaments—not shown in further detail—may be used for this purpose which can be deposited in the usual way by depositing the printing material.

In order to be able to better adjust the temperature of the deposited material, compressed air can be supplied via the compressed air source 26.

This compressed air is first passed through the pressure reducer 30 and then through the flow heater 28 in order to heat the connected compressed air and adjust the temperature.

The pressure reducer 30 is used to accordingly adjust the input air pressure so that the system 10 cannot be overloaded with too much compressed air or an excessive air mass.

In addition, there is a continuous flown through the flow heater 28 in order to prevent the flow heater 28 from burning out. For this reason, the possibility is also provided that air can be let into the build-up chamber 12, provided that the corresponding component, which is currently being printed, should not be subjected to any flow.

The controllable valve 32, serving to guide air to the print head 14 or into the building chamber 12, is used to adjust the air flow individually to the deposition strategy. Here, an adjustment in the range between 0 l/min and 20 l/min is possible. In this context, 0 l/min means that the air is directed completely into the build-up chamber 12, while 20 l/min or the corresponding upper end means that 100% of the available air mass can be directed directly onto the component.

Via the nozzle system 22, the air is then guided directly onto the component. The aim of this technological design is to be able to blow tempered air, theoretically also cooled air or air at room temperature, or even hot air, too, in a targeted manner against individual strands or to discharge it in a pulsed manner or adapted to the corresponding component region.

The pulse-wise or sequential discharge of air can be achieved by the controllable valve 32 and a control element not shown in detail. It is also conceivable to have this control done manually.

Via the cooling element 18, it is possible to influence the mechanical properties of the deposited strands accordingly. It is also conceivable to influence the surface quality of the component in this way.

The air is selectively discharged against the deposited strands via the nozzle system 22. In order to control the air flow or to influence the air volume, the valve 32 is correspondingly activated to regulate all these parameters. This valve 32 can be controlled in accordance with the machine code. The machine code is the code that tells the system 10 which print output should be made via the printing run correspondingly.

The flow heater 28 can also be used to control individually which temperature should be used here.

In principle, it is also conceivable that the temperature can be set by means of the flow heater 28 in such a way that certain sub-areas can be melted again and then, if necessary, supplied with further material or cooled again after melting. This makes it possible to manipulate the printed material again.

Initially, the air input into the system 10 can be achieved via a compressed air inlet, which may be coupled with a throttle valve. Coupling with a throttle valve is optional.

For applications in the medical technology sector, an appropriate filter is used, in particular upstream of the pressure reducer 30 and also the throttle valve or in connection with the compressed air inlet in order to prevent contaminations of the component.

The cooling element 18 allows a local cooling to be achieved for the implementation of fine features or component structures. The local cooling also serves to adjust the mechanics and the microstructure of the material, for example the crystallinity. It is also possible to achieve corresponding surface qualities.

The exemplary embodiment allows to generate temperatures of up to 500° C., whereby a wide range of applications can be achieved.

REFERENCE NUMERALS 10 additive manufacturing system
12 build-up chamber
14 print head
16 print material deposition device
18 cooling element
20 air supply
22 nozzle system
24 ring nozzle
26 compressed air source
28 flow heater
30 pressure reducer
32 valve

The invention claimed is:

1. A print head for an additive manufacturing system, the print head comprising a compressed air source, a pressure reducer, and at least one temperature control element, the at least one temperature control element of the print head includes a ring nozzle arranged adjacent to a print material deposition device of the print head, the at least one temperature control element comprising at least one flow heater, wherein the compressed air source is configured to provide compressed air to the at least one flow heater via the pressure reducer, and wherein the compressed air is heated at the at least one flow heater and flowed to the ring nozzle, wherein the at least one temperature control element comprises at least one controllable valve positioned downstream of the at least one flow heater and upstream of the print material deposition device, wherein the at least one controllable valve is constituted such that the at least one controllable valve adjusts air mass flow therethrough to the ring nozzle of the at least one temperature control element, the ring nozzle surrounding the print material deposition device of the print head, wherein the at least one controllable valve is positioned in a build-up chamber, wherein the at least one controllable valve is configured to guide air to the ring nozzle or into the build-up chamber, and wherein the at least one controllable valve is configured to provide an adjustment in a range, wherein a first end of the range comprises all of the air being directed completely into the build-up chamber, and wherein a second end of the range comprises all of the air being directed completely onto a component being manufactured by the additive manufacturing system.

2. The print head according to claim 1, wherein the at least one temperature control element is or comprises at least one fluid supply.

3. The print head according to claim 2, wherein the at least one fluid supply is a cooling air supply.

4. The print head according to claim 1, wherein the at least one temperature control element is or comprises at least one nozzle.

5. The print head according to claim 1, wherein the at least one temperature control element is in a fixed position.

6. The print head according to claim 1, wherein the at least one temperature control element comprises at least one fluid source.

7. The print head according to claim 1, wherein the additive manufacturing system is for a 3D printer.

8. The print head according to claim 1, wherein the at least one temperature control element is a cooling element.

9. The print head according to claim 1, wherein there is a continuous air flow through the at least one flow heater.

10. The print head according to claim 1, wherein the first end of the range is 0 l/min, and wherein the second end of the range is 20 l/min.

11. An additive manufacturing system, comprising at least one print head according to claim 1.

* * * * *